Patented Sept. 27, 1927.

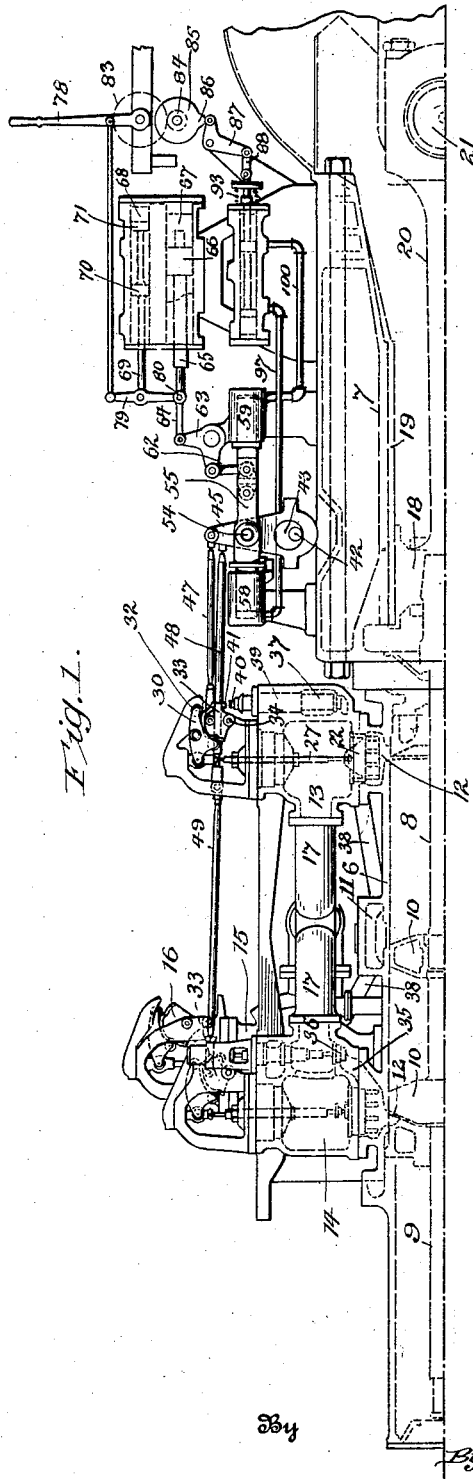

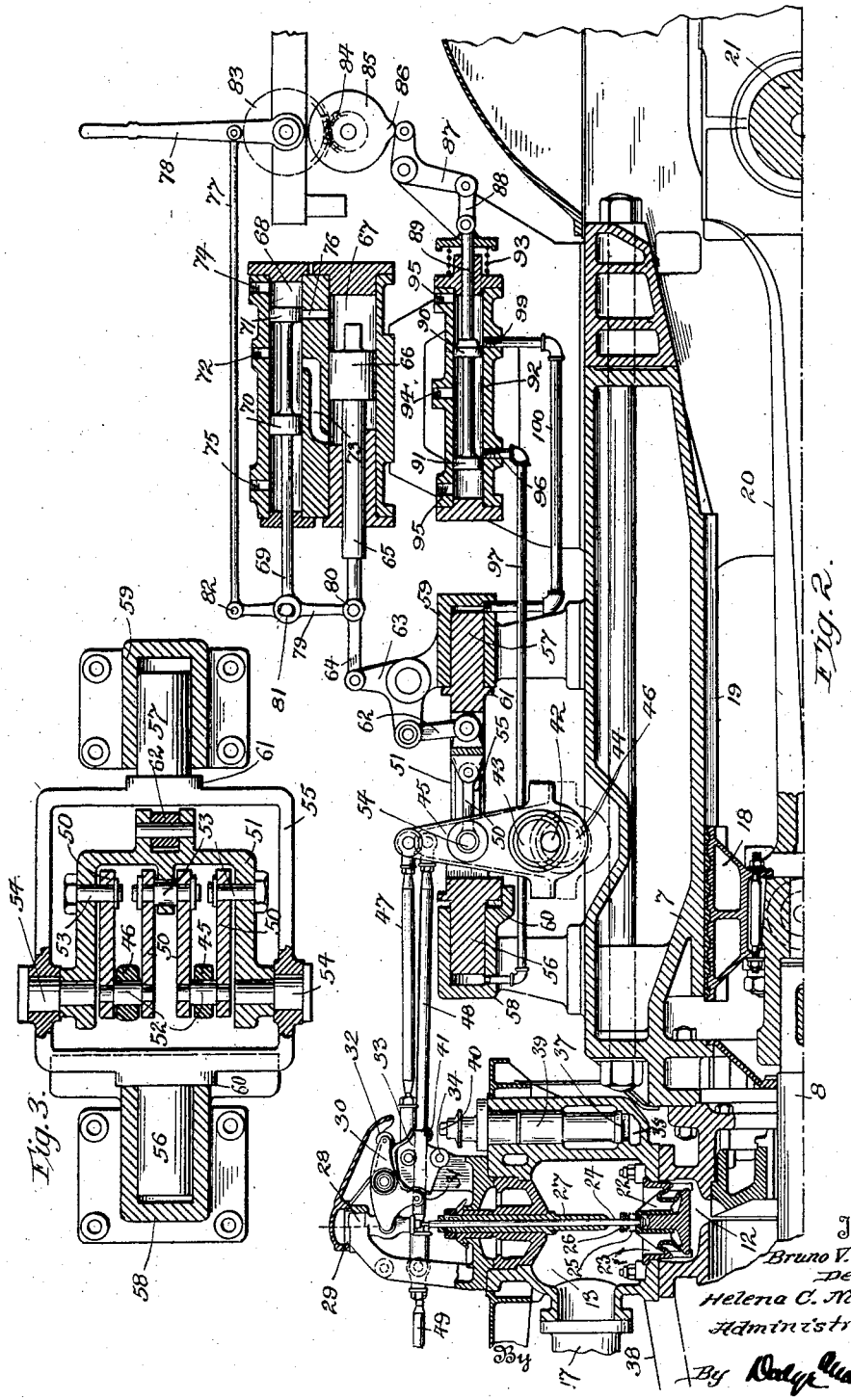

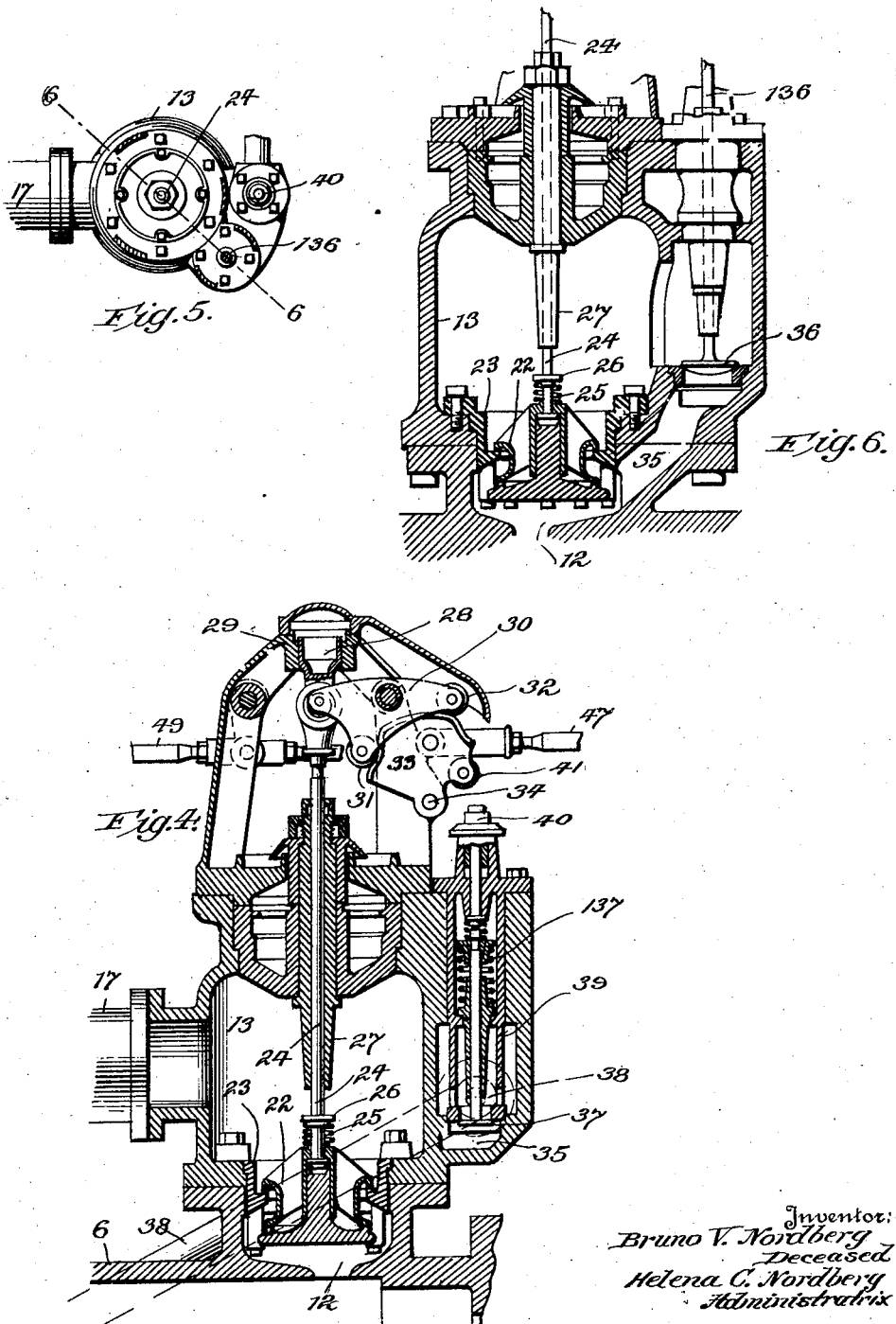

1,643,853

UNITED STATES PATENT OFFICE.

BRUNO V. NORDBERG, DECEASED, LATE OF MILWAUKEE, WISCONSIN, BY HELENA C. NORDBERG, EXECUTRIX, OF MILWAUKEE, WISCONSIN.

VALVE GEAR FOR STEAM ENGINES.

Application filed May 21, 1925. Serial No. 31,956.

This invention relates to valve-gears for steam engines and particularly to a reversing valve-gear so designed as to permit complete maneuvering of the engine, i. e., starting, stopping, and reversing, solely by manipulation of the valve-gear and without the necessary intervention of any throttling action on the inlet steam.

The invention is particularly intended for use on multi-cylinder reversing rolling mill engines of the type described and claimed in my application Ser. No. 31,954 filed May 21, 1925, and is illustrated as applied to one cylinder unit of such an engine. It is, however, available for use in other connections and no necessary limitation to this particular field is implied. However, the peculiar conditions affecting reversible rolling mill engines impose such severe requirements that the utility of the invention, and certain important aspects of its embodiment in this particular field, can best be developed by describing the valve-gear as so applied.

Reversible rolling mill engines as heretofore used have been probably the most wasteful steam prime movers in extensive use, and being engines of very large power, the improvement of their economy is a matter of great economic importance. Such an engine must be capable of instant stopping and reversal: it must be capable of starting in unfavorable crank positions under full load, and must not be subject to sudden changes in speed occasioned by sudden changes of load. This problem heretofore has been met by using two cylinders set quartering and operating at a long cut-off, always more than 80% and seldom less than 90%. In this way high starting torque in unfavorable crank positions was secured. Quick reversal was secured by elimination of the fly wheel and reduction of rotating masses to the minimum possible. Smooth action under sudden load variations was secured by throttling the inlet steam so that pressure would build up to meet increases of load, and the throttling of the steam would check sudden accelerations under sudden decreases of load. The combined effect of the throttling action and the long cut-off necessarily resulted in low over-all efficiency.

The related application, above identified, describes and claims an engine having three or more cylinders arranged so that the dead points are uniformly spaced, the engine being controlled by a reversing valve-gear of a specially modified Marshall type. The modification consists in varying the length of the radius rod relatively to the radius of the quadrant, so that a variable lead characteristic is secured, and in such a way that the lead is maximum in full-gear positions and decreases toward mid-gear until at mid-gear the inlet valves do not open at all. This characteristic requires the use of a separate inlet valve-gear for each inlet valve, as will be apparent on consideration. To avoid the necessity of controlling exhaust valve-gears and also for the purpose of reducing clearances, use is made of a terminal exhaust or uniflow type of cylinder.

The use of the uniflow type of cylinder involves a difficulty occasioned by the fact that the exhaust can occur only near the end of the working stroke, so that upon reversal under certain conditions, steam would be trapped in certain cylinders and could not escape through the exhaust belt. This problem is solved in the structure of the prior application by making use of unloading valves, one for each working space, the unloading valves being so arranged adjacent the inlet valves that they are actuated through the long travel of the inlet valve mechanism which occurs in both full gear positions.

The resulting engine requires no throttling regulation, is controlled solely through the reversing valve-gear, and operates under full load at a relatively short maximum cut-off, with capability of operating under light loads at quite short cut-offs.

In illustrating the present invention there has been chosen for purposes of explanation an engine of the uniflow type equipped with unloading valves actuated in the manner described and claimed in said prior application, so this feature is not claimed in the present application for that reason. The present invention, in fact, centers around details of the valve-gear itself and resides in a construction in which a reversing valve-gear having a constant lead characteristic is used, one valve-gear being used for each inlet valve, as in the case of the other application. In order to close the inlet valves in mid-gear position, and thus provide the necessary neutral or mid-gear stopping position, means are provided for modifying the action of the valve-gear in mid-gear position so that independently of the action of the valve-gear and regardless of the position thereof, all inlet valves are moved to closed position automatically when the valve-gear is set in mid-gear position.

More specifically, use is made of a valve-gear of the Marshall type in which the radius rods and the quadrant radius are equal. This is the conventional type of Marshall gear having a constant lead characteristic. With this gear a mechanism is provided which functions in mid-gear position, and only in mid-gear position, to shift the quadrant bodily, so as to displace the valve-gear and close the inlet valves. This result can be effected in a number of ways, but the preferred structure for accomplishing it consists of a shiftable support upon which the quadrant is mounted, the shiftable support being so related to the quadrant-setting mechanism that when the quadrant is set in mid-gear position, the shiftable support will be moved bodily a distance sufficient to neutralize the lead and close the inlet valves.

This preferred embodiment is illustrated in the accompanying drawings, in which

Fig. 1 is a partial side elevation of one cylinder-unit complete, together with the servo-motor mechanism by which the valve-gear is maneuvered;

Fig. 2 is an enlarged fragmentary longitudinal section somewhat diagrammatic in character, showing the valve-gear, the maneuvering mechanism therefor, and the connections from the valve-gear to the inlet valves;

Fig. 3 is a fragmentary plan view, on a still further enlarged scale, showing the shiftable support for the quadrant yokes and the arrangement of these yokes and of the eccentric rods.

Fig. 4 is a fragmentary view showing a portion of Fig. 1, enlarged.

Fig. 5 is a fragmentary plan showing the relative locations of the inlet, unloading and relief valves.

Fig. 6 is a section on the line 6—6 of Fig. 5.

The cylinder is shown at 6 and a portion of the main frame at 7. The piston rod is illustrated at 8 and the tail rod at 9. The piston, which is of the elongated type characteristic of terminal exhaust engines, consists of two heads 10, 10 spaced apart on the rod 8, this being a familiar construction in engines of this type. The exhaust belt is shown at 11, the inlet steam ports at 12, the crank end steam chest at 13, and the head end steam chest at 14. The main throttle valve, whose form is not material to the present invention, is shown at 15 and a cam mechanism for actuating this throttle valve at 16. The inlet steam connections are shown at 17. The cross head is shown at 18, guides at 19, connecting rod at 20, and crank pin at 21. The crank shaft is not illustrated, but is of ordinary construction.

The construction of the steam inlet valves is best shown in Fig. 2. The inlet valve consists of a double-beat poppet valve 22 which seats in the usual cage 23 and which is actuated by a stem 24 through a resilient connection consisting of a compression spring 25 held between a collar 26 on the stem 24 and the upper end of the poppet valve 22. The purpose of this construction is to secure a slightly yielding seating pressure on the valve 22 when the latter is closed. The stem 24 reciprocates in a guide sleeve 27 and carries at its upper end a head 28 which slides in guideway 29. The head 28 is linked to and actuated by a cam follower 30 which has two rollers 31 and 32 which coact with an actuating cam 33 in such a way that as the cam 33 is oscillated about its pivot 34, the head 28 is positively reciprocated in a vertical direction. The parts are so arranged and the cam 30 is so formed that as the cam 33 oscillates, the follower 30 is positively actuated through the rollers 31 and 32 to impart sudden upward and downward movements to the head 28 and so that the cam 33 may have slight over-travel while maintaining the inlet valve either open or closed, according to the direction of the over-travel (see Fig. 4).

A branch port 35 (see head end valve, Fig. 1 and Figs. 4, 5 and 6) leads from inlet port 12 to the space below two auxiliary valves which are closely related to each inlet valve, there being two of these auxiliary valves for each inlet valve. The first auxiliary valve is shown in dotted lines at 36 on the head end inlet valve in Fig. 1, and in detail in Fig. 6. It is carried by stem 136 and controls a passage from the branch port 35 to the steam chest 13 and consists of a single beat poppet valve opening toward the inlet steam connection 17 and held seated by inlet steam pressure. It is merely a safety device to vent steam from the cylinder to the inlet steam connection if cylinder pressure should exceed inlet steam pressure, as it might do in the event of accident or maladjustment of the inlet valve or of the unloading mechanism. It is therefore a relief valve and will be referred to hereinafter by this name.

The second auxiliary valve is shown at 37 in dotted lines in connection with the crank end inlet valve on Fig. 1, and is shown more in detail on Figs. 2 and 4. It is a poppet valve controlling the communication from the port 35 to a branch port 38 which leads to the exhaust belt 11 (see Fig. 1). The valve 37 is a single beat poppet valve which opens toward the port 35 and hence normally is held closed by cylinder pressure and also by a spring, 137, enclosed in the sleeve or bonnet 39 which supports and guides the valve 37 (see Fig. 4). The valve 37 is actuated by a head 40 on the upper end of its stem, and this head 40 is located below a roller tappet 41 on the inlet valve actuating cam 33. The parts are so arranged and proportioned that when the cam 33 has its maximum range of movement, which occurs in both full gear positions, the valve 37 will be opened when the inlet valve 22 is closed. It follows from this construction that when the valve-gear is set in full gear position for either forward or reverse rotation, the unloading valve 37 will be opened if the corresponding inlet valve 22 be closed. The effect of this is that when the engine is stopped by the movement of the valve-gear to mid-gear position, such steam as is trapped in any working space will be vented to the exhaust automatically through the unloading valve by the movement of the valve-gear to either full gear position. Such shifting occurs as an incident to starting the engine in either direction.

It is not feasible in an engine of large size to mount the valve-actuating eccentrics on the crank shaft. Consequently a lay shaft 42 is provided to carry the eccentrics. The lay shaft 42 is parallel with the crank shaft and is driven in the same direction and at equal speed with the crank shaft by any suitable drive mechanism, this detail being omitted from the drawings.

The lay shaft 42 carries for each cylinder of the engine two eccentrics 43 and 44 spaced 180° from each other, the eccentric 43 being used to actuate the crank end inlet valve. The eccentric 43 is provided with a strap or eccentric rod 45 and the eccentric 44 with a strap or eccentric rod 46. The eccentric rod 45 is connected by a reach rod 47 with the cam 33 which actuates the crank end inlet valve. The eccentric rod 46 is connected by two inter-connected reach rods 48, 49 with the cam 33 which actuates the head end inlet valve.

The eccentric rods 45 and 46 are guided by radius bars 50 (see particularly Fig. 3) supported on a quadrant yoke 51, the radius bars 50 being pivoted both to the eccentric rods 45 and 46 at 52, and to the quadrant yoke 51 at 53. The quadrant yoke 51 itself is pivoted on the trunnions 54. The distance on centers between the trunnions 54 and the pivots 53 is equal to the distance on centers between the pivots 53 and the pins 52. The valve gear is set to produce variable cut-off in both forward and reverse running by swinging the quadrant yoke 51 on the trunnions 54.

This will be recognized as a familiar arrangement of Marshall valve gear to produce reversal and variable cut-off with constant lead in all settings, both forward and reverse. In the conventional Marshall valve gear the trunnions 54 for the quadrant are fixedly mounted, but according to the present invention they are shifted bodily when the valve-gear is set in mid-gear position a distance sufficient to close the inlet valves and stop the engine. This shifting might be effected by any means operable in harmony with the mechanism for swinging the quadrant 51 on the trunnions 54, but in large engines it is desirable to make use of a hydraulic servo-motor to swing the quadrant, and accordingly I provide a related hydraulic means for shifting the quadrant in mid-gear position of the quadrant to neutralize the lead.

The trunnions 54 are carried on a guide yoke 55 which is supported by two piston heads 56 and 57 guided in hydraulic or oil pressure cylinders 58 and 59. These cylinders are mounted, as shown, on the frame 7 and the necessary shifting motion of the yoke 55 is effected by admitting pressure fluid to one hydraulic cylinder and simultaneously exhausting it from the other. The normal or running position is with the yoke 55 to the left, that is, toward the head end of the engine, and in this position it is arrested by the collision of the shoulder 60 with the end of the cylinder 58. The abnormal position assumed in mid gear to neutralize the lead is to the right, or toward the crank end of the engine, in which position the yoke is arrested by the collision of the collar 61 with the end of the cylinder 59.

The quadrant 51 is connected by a link 62, bell crank lever 63, and link 64 with the piston rod 65 attached to piston 66. Piston 66 works in a cylinder 67 and acts therein as a differential piston, the effective area of the left side of the piston 66 being less than the effective area of the right side. Consequently when both sides are subject to the same pressure, the piston 66 moves to the left, while when pressure is maintained on the left side and vented from the right side, the piston moves to the right. The action of the piston is controlled by a piston valve working in the valve chest 68, the valve consisting of a stem 69 and two spaced heads 70 and 71 mounted thereon. Oil or water under pressure is supplied through a port 72 to the space between the heads 70 and 71, and this space is constantly in communication through the port 73 with the cylinder space to the left of the piston 66, i. e., that side which has the smaller effective area. The space to the right of the valve head 71 is connected to exhaust by means of a port 74, while the port 75 performs a similar function for the space to the left of the valve head 70. The head 71 in its right hand position connects the supply port 72 with a feed port 76 leading to the space at the right of piston 66, and in its left hand position it connects the port 76 with the exhaust port 74. Between these two positions is a lap position, shown in Fig. 2, in which port 76 is blanked by the head 71.

The valve stem 69 is subject to the joint control of the piston rod 64 and of a reach rod 77 connected to a hand maneuvering lever 78. This is effected by means of a floating lever 79, pivoted at 80 to the piston rod 65, and having a pin-and-slot connection at 81 with the valve stem 69 and pinned at 82 to the reach rod 77. It results that for each setting of the hand lever 78 there is a corresponding position of the piston 66 and of the quadrant 51 connected thereto.

This follow-up action is quite close. The head 71 is so dimensioned as just to blank port 76 in lap position (Fig. 2). Consequently a very slight displacement of head 71 to the right (with reference to Fig. 2) caused by motion of lever 78 admits pressure fluid against the right side of piston 66 and the resulting movement of the piston 66 to the left restores head 71 to lap position. Similarly, a slight movement of head 71 to the left caused by motion of lever 78 vents pressure fluid from the right side of piston 66. The consequent motion of piston 66 to the right laps head 71 once more. Hence the piston 66 follows the motions of lever 78 accurately but in the opposite direction, as a result of the connections shown.

Mounted co-axially with the lever 78 to turn therewith is a gear 83 which meshes with a smaller gear 84. Fixed to the gear 84 is a circular disc cam 85 having a single boss or projection 86 which in mid-gear position engages and shifts a bell crank lever 87. The lever 87 is connected by a link 88 with the stem 89 of a piston valve made up of two heads 90 and 91 sliding in a valve cylinder 92. The stem 89 is constantly urged to the right by a spring 93 so that one arm of the bell crank lever 87 is kept constantly in contact with the cam 85. The valve chest 92 is provided with the supply port 94 and two exhaust ports 95. The port 96 is connected by a pipe 97 with the cylinder 58, and a port 99 is connected by a pipe 100 with the cylinder 59. Thus in mid-gear setting of the lever 78 the piston valve heads 90, 91 are shifted to the left, so that cylinder 58 is under pressure and cylinder 59 is exhausted. This moves the quadrant yoke 51 bodily to the right and neutralizes the lead, ensuring the closing of all inlet valves. It will be observed that this occurs only at and near mid-gear position. The use of the gears 83 and 84 ensures such rapid movement of the cam 85 relatively to the lever 78 that if the lever 78 be displaced even slightly from mid-gear position, the piston valve 90, 91 will be shifted to the right, connecting the cylinder 59 with the pressure supply and exhausting the cylinder 58, and restoring the valve gear to its normal constant-lead setting.

The operation of the various component parts of the mechanism have been outlined in connection with their description and no further detailed discussion seems necessary.

Assume that a multi-cylinder engine having valve gear as described is at rest. In such case the servo-motors will be positioned as shown in Fig. 2 and all inlet valves will be closed. To start the engine in one or the other direction, the operator shifts the lever 78 to full gear position in one or another direction. Through the connected valve gears and servo-motor mechanisms the yoke 55 for each cylinder is immediately shifted to its normal left hand position and the quadrant 51 for each cylinder is immediately swung to its extreme upper or lower position, as the case may be. In such extreme position of the quadrant yoke, the horizontal components of motion of the upper ends of the eccentric rods 45 and 46 are maximum. Consequently, if the piston has not passed the maximum point of cut-off for any working space, the corresponding inlet valve must open. The other inlet valves will remain closed. Unloading occurs in those working spaces whose cams 33 are at or near the limit of their swinging motion to the right. This unloading occurs in full gear position, and only in full gear position, because in such position alone the range of motion of the reach rods 47 and 48 reaches its maximum.

As soon as the engine is in motion, the operator moves the lever 78 part way toward mid-gear position. As the lever approaches mid-gear position, the cut-off will be shortened. To stop the engine, the lever is moved to mid-gear position. The movement of the valve gear to mid-gear position would not alone stop the engine, for since there is constant lead, the engine would run in mid gear in either direction, if already in motion. However, in this position the cam 86 shifts the valve stem 89 and this action brings about the shifting of the yoke 55 toward the crank end of the engine, neutralizing the lead and closing all inlet valves. It will be observed that when the engine stops in this manner, certain of the working spaces are likely to be under pressure, because the inlet valves are closed and certain pistons will not have completed their strokes. This confined steam is vented by the unloading valve when the valve gear is moved to full gear position, as described, to start the engine.

Obviously the mechanism is susceptible of embodiment in a number of different forms and I do not limit myself to the structure illustrated except to the extent specified in the claims. It should be appreciated that the illustration in the accompanying draw-

What is claimed is:

1. The combination of a reciprocating engine having a reversing inlet valve linkage normally characterized by the existence of lead in all settings; and automatic modifying means operable to neutralize such lead in mid-gear position.

2. The combination of a reciprocating engine having a reversing inlet valve linkage normally characterized by the existence of lead in all settings; modifying means operable to neutralize such lead; and means for setting said valve gear in various positions including automatic means for operating said lead-neutralizing means in mid-gear setting of the valve linkage.

3. The combination of a reciprocating engine having a reversing inlet valve gear normally characterized by the existence of lead in all settlings; modifying means operable to neutralize such lead; two independent actuators, one serving to set said valve gear in its various normal positions, and the second serving to actuate said modifying means; and a single control mechanism for said two actuators adapted to operate them in definite relation to each other.

4. The combination of a reciprocating engine having a reversing inlet valve gear of the Marshall constant-lead type including a guiding quadrant; means for shifting such quadrant to neutralize such lead; two independent actuators, one serving to set said quadrant, and the second serving to actuate said quadrant-shifting means; and a single control mechanism adapted to operate said actuators in definite relation with each other.

5. The combination with a reciprocating steam engine having means for admitting and exhausting steam including an inlet valve, of a reversing valve linkage connected to actuate said valve and having a constant-lead characteristic; a mechanism associated with said valve linkage and operable to maintain said inlet valve closed in all positions of the engine; and automatic means for causing said mechanism to function when said valve linkage is placed in mid-gear position.

6. The combination with a reciprocating steam engine having means for admitting and exhausting steam including an inlet valve, of a reversing valve gear connected to actuate said valve and having a constant-lead characteristic; a mechanism associated with said valve linkage and operable to displace a portion thereof to neutralize said lead and close said inlet valve regardless of the position of the engine; and automatic means for causing said mechanism to function when the valve linkage is placed in mid-gear position.

7. The combination with a reciprocating steam engine having means for admitting and exhausting steam including an inlet valve; a reversing, variable cut-off valve gear having a guiding quadrant; and automatic means serving in the mid-gear position of said valve gear to displace said quadrant in a direction to close said valve regardless of the position of said engine.

8. The combination with a reciprocating steam engine having means for admitting and exhausting steam, including an inlet valve, of a reversing valve gear connected normally to actuate said valve with lead; means operable to neutralize the lead normally imparted to said valve by said valve gear; maneuvering means for setting said valve gear in forward and reverse and mid-gear positions; and connections between said maneuvering means and said lead-neutralizing means, serving to render the latter active to neutralize the lead, when said maneuvering means is set for mid-gear position of said valve gear.

9. The combination with a reciprocating steam engine having means for admitting and exhausting steam including an inlet valve, of a reversing valve gear connected normally to actuate said valve with lead; means operable to neutralize the lead normally imparted to said valve by said valve gear; maneuvering means for setting said valve gear in forward and reverse, a cam for actuating said lead neutralizing means; and a speed multiplying connection for driving said cam from said maneuvering means, the parts being so related that the cam functions only when the maneuvering means is in mid-gear position.

10. The combination of a reciprocating engine having a reversing inlet valve gear of the Marshall type, including a radius bar and a guiding quadrant for said radius bar of equal radius therewith; a member for supporting said quadrant shiftable in an inlet valve closing direction; a servo-motor for adjusting the relation of the quadrant and radius bar; a servo-motor for positioning said shifting member; and a control member common to said two servo-motors and connected to actuate them in such relation that said shiftable member is shifted to valve-closing position when, and only when, said bar and quadrant are substantially in mid-gear relation.

In testimony whereof I have signed my name to this specification.

HELENA C. NORDBERG,
*Executrix of the Estate of Bruno V. Nordberg.*